United States Patent
Haraguchi et al.

(10) Patent No.: US 6,671,115 B2
(45) Date of Patent: Dec. 30, 2003

(54) SERVO SIGNAL PROCESSING APPARATUS, RECORDED DATA READING APPARATUS AND METHOD FOR PROCESSING SERVO SIGNAL

(75) Inventors: Hiroko Haraguchi, Kasugai (JP); Masaru Sawada, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,277

(22) Filed: Mar. 15, 2000

(65) Prior Publication Data

US 2003/0007273 A1 Jan. 9, 2003

Related U.S. Application Data

(62) Division of application No. 08/994,598, filed on Dec. 23, 1997, now Pat. No. 6,052,244.

(30) Foreign Application Priority Data

May 20, 1997 (JP) ............................................ 09-130121

(51) Int. Cl.⁷ ............................ G11B 5/09; G11B 20/12
(52) U.S. Cl. .......................................... 360/48; 360/51
(58) Field of Search ................................ 360/48, 77.08, 360/78.04, 78.14, 49, 51; G11B 20/14, 20/12, 5/09

(56) References Cited

U.S. PATENT DOCUMENTS

| | | | |
|---|---|---|---|
| 5,255,131 A | * 10/1993 | Coker et al. | 360/48 |
| 5,384,671 A | 1/1995 | Fisher | 360/77.08 |
| 5,420,730 A | * 5/1995 | Moon et al. | 360/77.08 |
| 5,422,760 A | 6/1995 | Abbott et al. | 360/46 |
| 5,862,005 A | 1/1999 | Leis et al. | 360/27 |
| 5,870,591 A | 2/1999 | Sawada | 360/51 |
| 6,498,695 B2 | * 12/2002 | Kosugi | 360/48 |

FOREIGN PATENT DOCUMENTS

| EP | 0 553 409 | 8/1993 | |
|---|---|---|---|
| EP | 0553409 A2 | * 8/1993 | .......... G11B/20/14 |

OTHER PUBLICATIONS

U.S. patent application Ser. No. 09/526,276, Haraguchi et al., filed Mar. 15, 2000.

* cited by examiner

Primary Examiner—David Hudspeth
Assistant Examiner—Dan I. Davidson
(74) Attorney, Agent, or Firm—Staas & Halsey LLP

(57) ABSTRACT

A servo signal processing apparatus for processing a servo signal corresponding to servo information from a servo area on a recording medium for controlling a head. The servo area includes a servo mark area for storing a servo mark indicative of a head of the servo area, a gray mark area for storing a gray mark indicative of a head of information for position control for the head, and a gray code area for storing information. An A-D converter converts the servo signal to digital data. A digital filter filters the converted data based on a sampling clock, and outputs the filtered digital data. A servo mark detector detects a servo mark based on a continuity of a first predetermined logical value. A gray code decoder detects a gray code based on a continuity of a predetermined logical value. The gray code decoder decodes information stored in a gray code area following the detected gray mark.

13 Claims, 8 Drawing Sheets

SERVO SIGNAL PROCESSING APPARATUS, RECORDED DATA READING APPARATUS AND METHOD FOR PROCESSING SERVO SIGNAL

This application is a divisional of application Ser. No. 08/994,598, filed Dec. 23, 1997, now U.S. Pat. No. 6,052,244.

BACKGROUND OF THE INVENTION

The present invention relates generally to a servo signal processing apparatus which processes servo information read from a servo area of a recording medium, and a recorded data reading apparatus.

While there has been a demand to increase memory capacity for magnetic disk devices, there has also been a demand for making such devices more compact. There has further been a demand to increase the data reading and writing speeds for such devices. To fulfill those demands, it is necessary to improve the efficiency of formatting magnetic disks and to reduce the circuit scale of a read channel IC, which is used in a recorded data reproducing apparatus.

In a conventional recorded data reproducing apparatus, analog data, which has been read via a head from a recording medium, is output to a read channel processor (hereinafter called "read channel IC"). The read channel IC has a data signal processor and a servo signal processor. The data signal processor is provided to acquire data information (user data) stored in an area of the disk. The data signal processor converts a read signal, input via a filter, to a digital signal and outputs the digital signal as user data.

The servo signal processor acquires information, such as head position information and head moving speed, from servo information stored in a servo area on the disk. The servo signal processor detects a peak position in accordance with a peak detection system. More specifically, the servo signal processor detects the peak position of the read signal, input via the filter, which has a level equal to or greater than a predetermined value set in an associated register. The servo signal processor checks the interval between detected peaks using an MPU (Micro Processor Unit) located outside the IC. Then, the servo signal processor determines whether the occasional read signal has a value of "1" or "0", as well as detects a servo mark and reads a gray code.

When detecting the servo mark, the servo signal processor converts the read servo information to digital data. The servo signal processor then outputs the digital data to an arithmetic operation unit, such as a DSP located outside the IC. The arithmetic operation unit performs computations, such as a complex operation on the input digital information to calculate position information or the like. The computed information is converted to an analog signal, which is in turn sent to a head driver, which controls and moves the head accordingly.

Because the servo signal processor determines if the occasional read signal has a value of "1" or "0", based on the interval between the detected peaks, the detection of a peak position becomes difficult as the interval between the detected peaks is narrowed. Maintaining as interval between the detected peaks, therefore, stands in the way of improving the recording density of the servo area and increasing the density of a disk.

Further, the read channel IC requires ten or more bits of data to be transferred in order to precisely control the read head. Therefore, the read channel IC is equipped with terminals (ten or more) for transferring multiple bits data and an interface circuit for transferring the multiple data to the DSP. The multiple terminals and the large-scale interface circuit inevitably increase the chip area of the read channel IC, which results in an increase in the manufacturing cost of ICs and reduces the data transfer speed.

Accordingly, it is an objective of the present invention to provide a servo signal processing apparatus and a recorded data reading apparatus, which are capable of improving the density of a recording medium.

It is another objective of the present invention to provide a servo signal processing apparatus and a recorded data reading apparatus, which can speed up the processing of servo information read from a recording medium.

SUMMARY OF THE INVENTION

To achieve the above objective, the present invention provides a servo signal processing apparatus for processing a servo signal corresponding to servo information from a servo area provided on a recorded medium for controlling a read head, the servo area including a servo mark area for storing a servo mark indicative of a beginning of the servo area, a gray mark area for storing a gray mark indicative of a beginning of information for position control for the read head, and a gray code area for storing information, the apparatus including: an A-D converter for sampling and converting the servo signal to a digital data signal; a digital filter connected to the A-D converter for filtering the digital data signal based on a sampling clock, and for outputting filtered digital data; a servo mark detector connected to the digital filter for receiving the filtered digital data and for detecting the servo mark area based on a first continuity of a predetermined logical value; and a gray code decoder connected to the digital filter for receiving the filtered digital data and for detecting the gray mark area based on a second continuity of a predetermined logical value, wherein the gray code decoder decodes the information stored in the gray code area following the detected gray mark area.

The present invention further provides a method for processing a servo signal corresponding to servo information stored at a servo area on a recorded medium, the servo information for controlling a read head, the servo area including a servo mark area for storing a servo mark indicative of a beginning of the servo area, a gray mark area for storing a gray mark indicative of a beginning of information for position control for the read head, and a gray code area for storing the position control information, the method comprising the steps of: sampling and converting the servo signal to a digital data signal with an analog-to-digital converter; filtering the digital data signal based on a sampling clock and generating filtered digital data; analyzing the filtered digital data to detect the servo mark area based on a first continuity of a predetermined logical value; analyzing the filtered digital data to detect the gray mark area based on a second continuity of a predetermined logical value; and decoding the information stored in the gray code area following the detected gray mark area.

Other aspects and advantages of the invention will become apparent from the following description, taken in conjunction with the accompanying drawings, illustrating by way of example the principles of the invention.

BRIEF DESCRIPTION OF THE DRAWINGS

The present invention, together with objects and advantages thereof, may best be understood by reference to the following description of the presently preferred embodiments together with the accompanying drawings, in which.

DETAILED DESCRIPTION OF THE PREFERRED EMBODIMENTS

Figure 1:
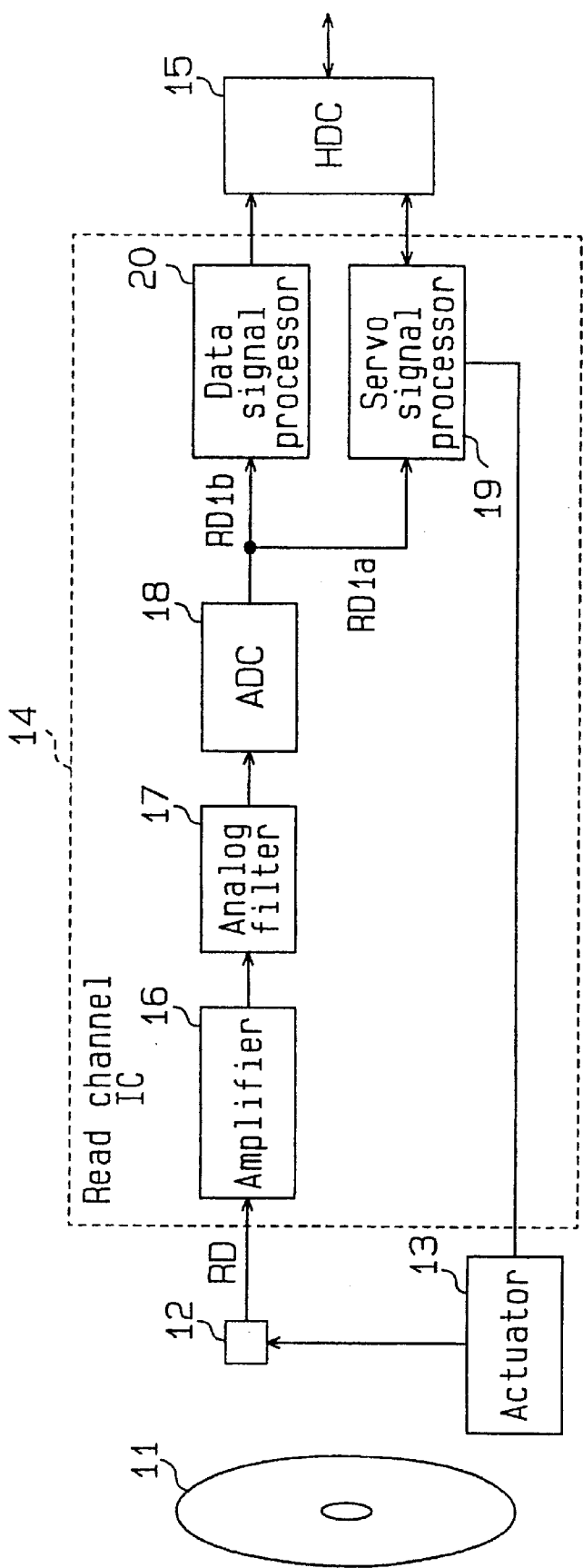
FIG. 1 is a schematic block diagram showing a recorded data reproducing apparatus.

In the drawings, like numerals are used to designate like elements throughout.

First Embodiment

A first embodiment of the present invention will now be described referring to FIGS. 1 through 9.

As shown in FIG. 1, a recorded data reading apparatus comprises a magnetic disk 11 as a recording medium, a read head 12, an actuator 13, a read channel IC 14 and a disk control circuit (hereinafter called "HDC") 15. The read channel IC 14 and the HDC 15 are provided on a single chip.

The magnetic disk 11 is turned by a spindle motor (not shown). The position of the read head 12 is controlled in the radial direction of the magnetic disk 11 by the actuator 13. The read head 12 reads information recorded on the disk and sends the information, as a read signal RD, to the read channel IC 14.

The read channel IC 14 includes an amplifier 16, an analog filter 17, an A-D converter 18, a servo signal processor 19 and a data signal processor 20.

The amplifier 16, comprised of a gain control amplifier, amplifies the read signal RD to a given amplitude, and sends the amplified signal to the analog filter 17. The analog filter 17 filters the output signal of the amplifier 16 and sends only a signal component of the amplified signal, whose frequency lies in a predetermined range, to the A-D converter 18. The A-D converter 18 converts the signal output from the analog filter 17 to a digital signal and sends the converted signal to the servo signal processor 19 and the data signal processor 20.

The servo signal processor 19 operates based on a control signal which comes from the HDC 15. The servo signal processor 19 detects a servo area on the magnetic disk 11, based on the digital signal output from the A-D converter 18, and generates a detection signal. Then, the servo signal processor 19 detects position information of the read head 12 based on servo information read from the servo area. The servo information is decoded based on a digital signal RD1a read from the servo area (which will be hereinafter called "servo signal"). The servo signal processor 19 controls the actuator 13 with an analog signal, which is produced based on the detected position information, to move the read head 12 to a target track or to perform a seek operation. The servo signal processor 19 also executes an on-track operation to match the position of the read head 12 with the track by controlling the actuator 13.

The data signal processor 20 generates a predetermined clock signal based on the digital signal output from the A-D converter 18, and detects a data area of the signal based on the clock signal. The data signal processor 20 operates based on the detection signal generated by the servo signal processor 19. The data signal processor 20 performs signal processing, like decoding a digital signal RD1b read from the detected data area (which will be hereinafter called "data signal") converting the signal to parallel data having a predetermined number of bits. The data signal processor 20 then outputs the converted data to the HDC 15.

The HDC 15 carries out the input/output processing of data with respect to a host computer (not shown). The HDC 15 performs a process like error correction on the input parallel data, and then sends the processed (corrected) data to the host computer in accordance with a predetermined communication system.

Figure 2:
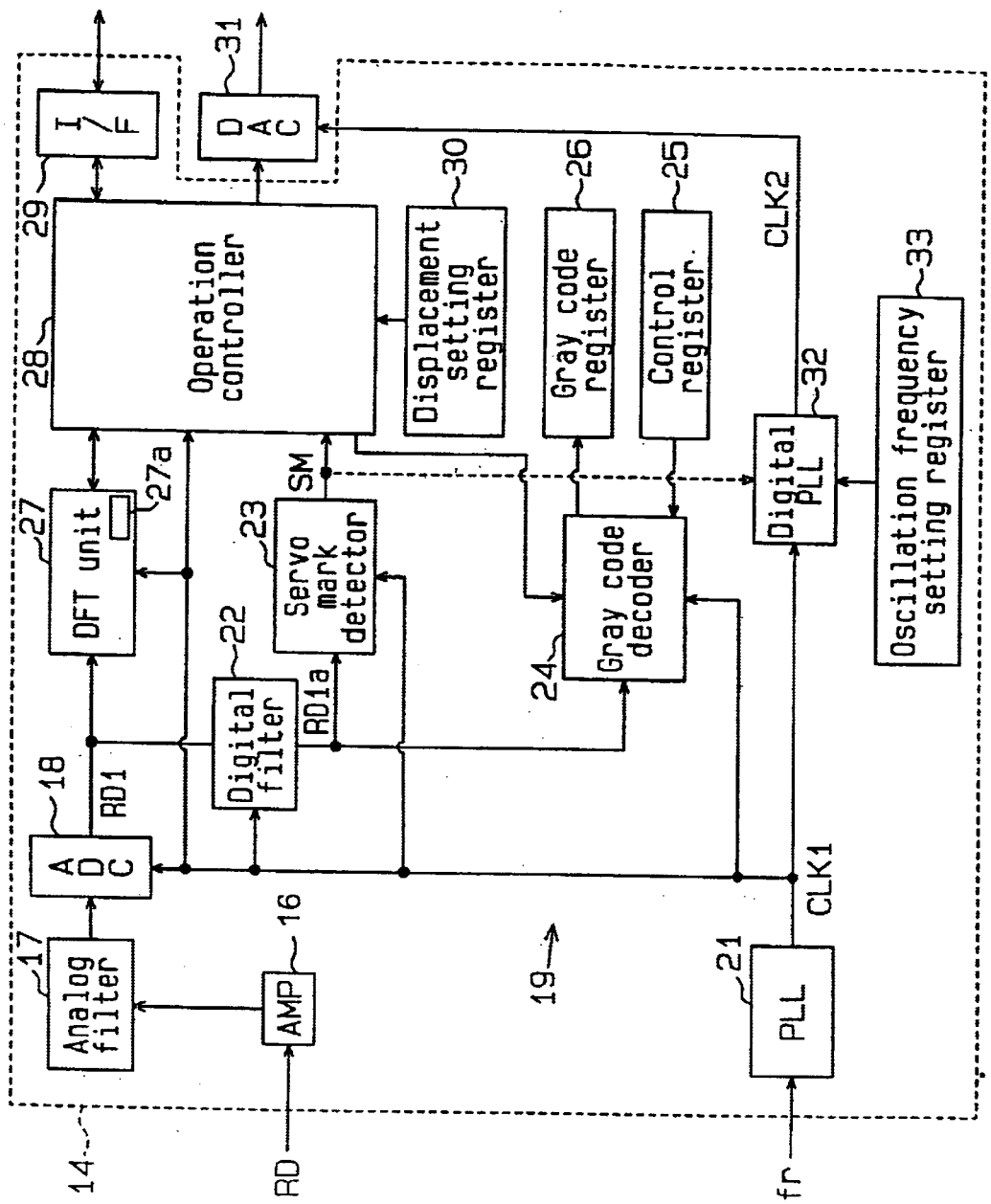
FIG. 2 is a schematic block diagram illustrating a part of a read channel IC according to a first embodiment of the present invention.

FIG. 2 is a block diagram of the servo signal processor 19. The servo signal processor 19 is provided with a PLL circuit 21, which is preferably an analog PLL circuit comprising a synthesizer PLL circuit. Based on a reference signal fr input from outside the read channel IC 14, the PLL circuit 21 generates a first clock signal CLK1, which is a reference to the operation of the servo signal processor 19. The PLL circuit 21 sends the first clock signal CLK1 to the A-D converter 18, a digital filter 22, a servo mark detector 23, a gray code decoder 24, a DFT (Discrete Fourier Transform) unit 27, an operation controller 28 and a digital PLL circuit 32. The individual circuits 18, 22, 23, 24, 27, 28 and 32 operate in synchronism with the first clock signal CLK1.

The A-D converter 18 and the servo signal processor 19 sample and process the servo signal, read from the servo area by the read head 12, based on the first clock signal CLK1. The first clock signal CLK1 has a frequency close to the frequency of the clock signal that is generated by the data signal processor 20. That is, the servo signal processor 19 and the data signal processor 20 perform a process in response to the clock signal of a frequency in the same band. Thus, the amplifier 16 and the analog filter 17 have the same characteristics with respect to the servo signal processor 19 and the data signal processor 20. The digital signal output from the A-D converter 18 is supplied to both signal processors 19 and 20.

The A-D converter 18 performs analog-to-digital conversion of the read signal RD, input via the analog filter 17, every time the first clock signal CLK1 is active, and sends the resulting digital data to the digital filter 22.

Figure 3:
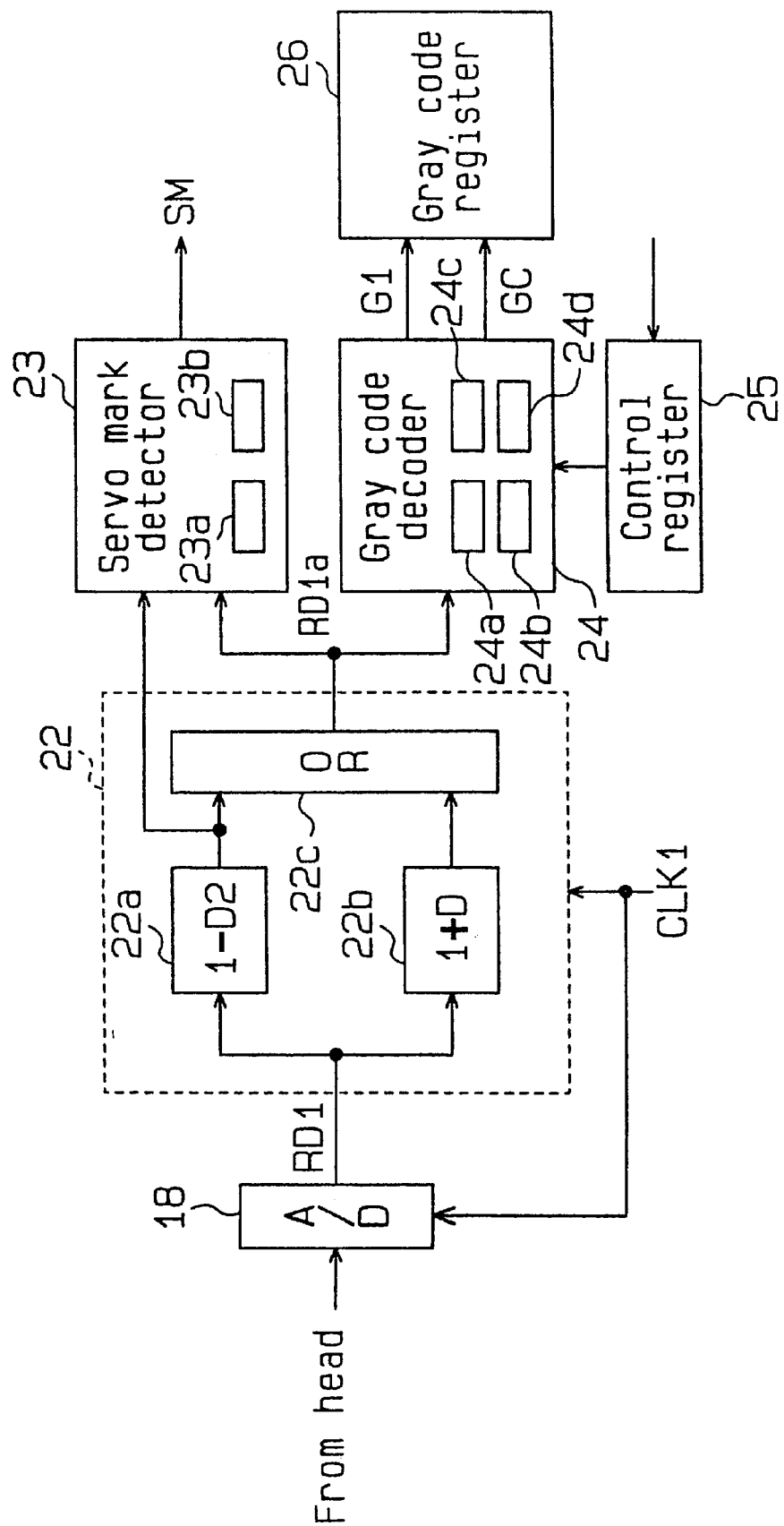
FIG. 3 is a schematic block diagram depicting a servo mark detector and a gray code decoder.

Both the digital signal output from the A-D converter 18 and the first clock signal CLK1 are input to the digital filter 22. As shown in FIG. 3, the digital filter 22 has a first filter 22a, a second filter 22b and an OR gate 22c. Based on the first clock signal CLK1, the first filter 22a sends "1" to the servo mark detector 23 and the OR gate 22c when the data to be processed then and the data which has been input two clocks earlier than that data are both "1". When the input data is other than the above combination, the first filter 22a outputs "0". Based on the first clock signal CLK1, the second filter 22b sends "1" to the OR gate 22c when the data to be processed then and the data to be processed by the next clock are both "1". When the input data is other than the above combination, the second filter 22b outputs "0". The OR gate 22c performs the logical sum of data from the first and second filters 22a and 22b. The OR gate 22c sends the operation result to the servo mark detector 23 and the gray code decoder 24 as the servo signal RD1a.

The servo mark detector 23 receives the servo signal RD1*a* and the first clock signal CLK1. The servo mark detector 23 has a 0 burst counter 23*a* and an error counter 23*b*. The 0 burst counter 23*a* counts up its count value when the servo signal RD1*a* "0" and clears the count value when the signal RD1*a* is "1". The error counter 23*b* counts up its count value every time the servo signal RD1*a* is input.

Figure 8:
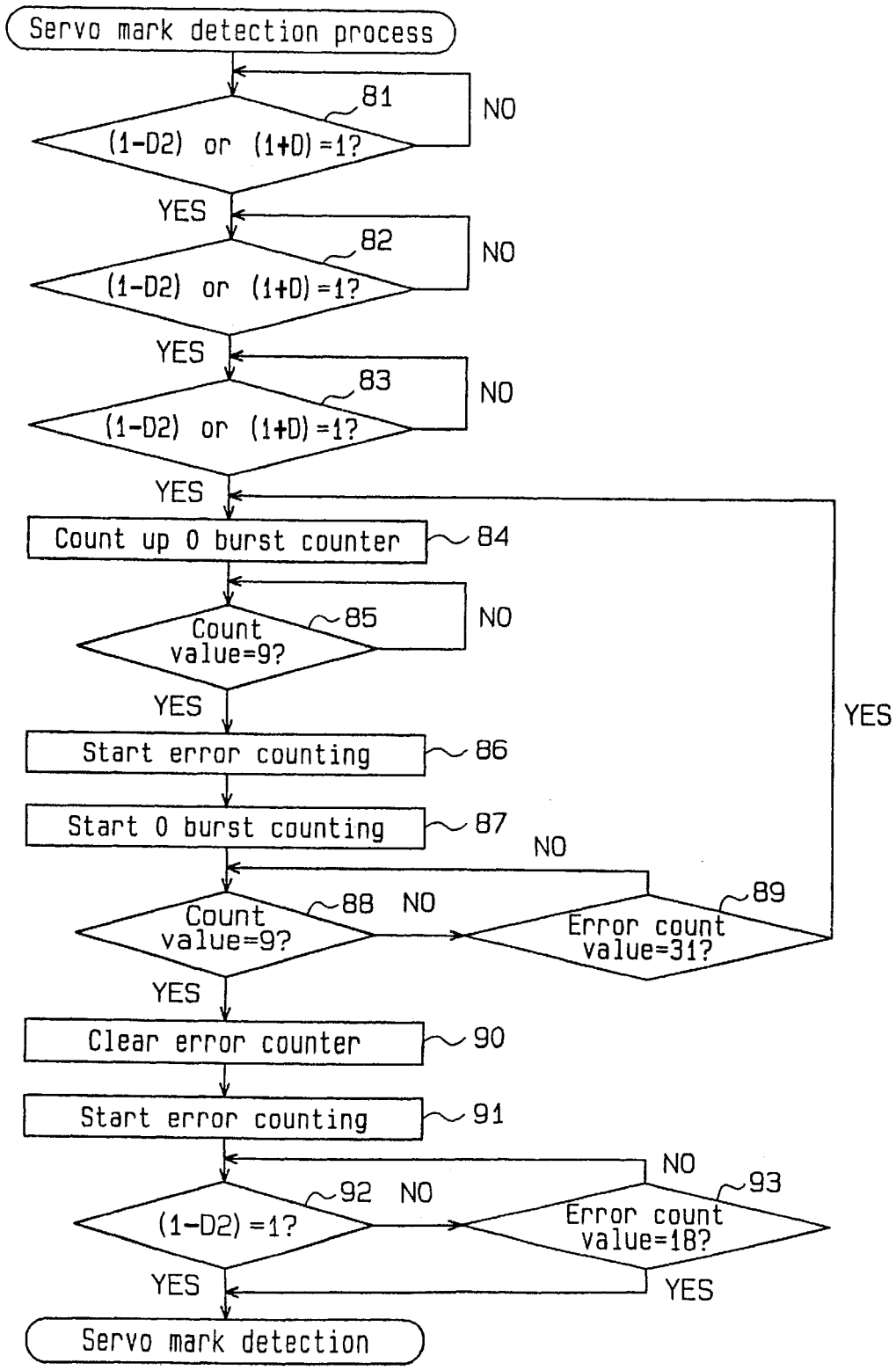
FIG. 8 is a flowchart illustrating a servo mark detection process.

The servo mark detector 23 operates based on the first clock signal CLK1 and executes servo mark detection in accordance with the flowchart illustrated in FIG. 8, discussed below. The servo mark detector 23 detects a servo mark based on the count values of both counters 23*a* and 23*b*, and sends a servo mark detection signal SM to the operation controller 28.

Figure 5:
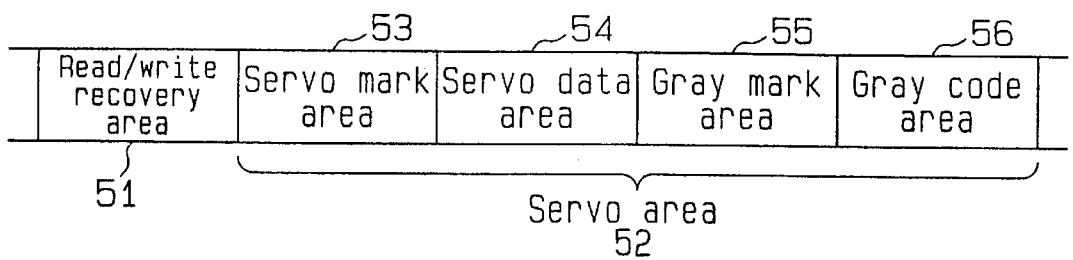
FIG. 5 is a diagram showing the format of a servo area.

As shown in FIG. 5, a read/write recovery area 51 is formed on the magnetic disk 11. A servo area 52 following the read/write recovery area 51 comprises a servo mark area 53, a servo data area 54, a gray mark area 55 and a gray code area 56. Recorded on the servo mark area 53 is information for detecting a reference for the beginning of a sector. Information for detecting the relative position of the read head 12 to a target track is recorded in the servo data area 54. Recorded on the gray mark area 55 is information for detecting a reference for the beginning of the gray code area 56. ID information, such as a sector number and a head number, is recorded in the gray code area 56.

Referring again to FIG. 1, both sides of a single magnetic disk 11 are recording surfaces where information is recordable. One or more read heads 12 are provided at each recording surface. The recorded data reading apparatus may be provided with a plurality of magnetic disks 11. In this case, different head numbers are allocated to the individual read heads 12, and the head number of the associated read head 12 is recorded in the gray code area 56.

Figure 6:
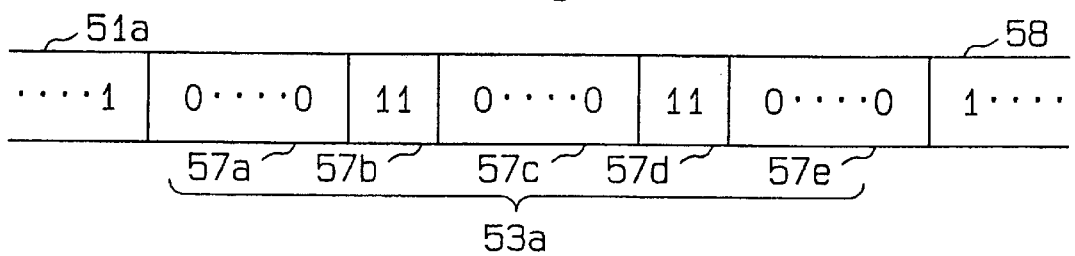
FIG. 6 is a diagram showing the format of a servo mark.

As shown in FIG. 6, servo mark data (hereinafter simply called "servo mark") 53*a* is stored in the servo mark area 53. The servo mark 53*a* is input to the servo mark detector 23, following read/write recovery data 51*a* which comprises a sequence of "1's". The servo mark 53*a* comprises a plurality of (three in this embodiment) 0 bursts 57*a*, 57*c* and 57*e* and gaps 57*b* and 57*d* inserted between the 0 bursts 57*a* and 57*c* and between the 0 bursts 57*c* and 57*e*. Each of the 0 bursts 57*a*, 57*c* and 57*e* comprises a predetermined number (n) of consecutive "0's" (12 bits in this embodiment). The gaps 57*b* and 57*d*, each comprise two bits of "1", separate the 0 bursts 57*a*, 57*c* and 57*e* from one another.

The servo mark detecting process will now be described specifically referring to FIG. 8.

First, the servo mark detector 23 waits for "1" to be input three times in steps 81 to 83. This is carried out so that even if the servo mark detector 23 erroneously detects the read/write recovery data 51*a* as "0", determining that "0" as the top of the servo mark 53*a* is avoided. When "1" is input three times, the servo mark detector 23 determines that the input data is at the top of the servo mark 53*a* and proceeds to the next step 84.

In steps 84 to 93, the servo mark detector 23 determines whether the servo mark has been detected, by detecting two of the three 0 bursts 57*a*, 57*c* and 57*e*.

Specifically, the servo mark detector 23 causes the 0 burst counter 23*a* to start the counting operation to detect the first 0 burst in step 84. In step 85, the servo mark detector 23 waits until the count value of the 0 burst counter 23*a* reaches the predetermined number of bits necessary for the determination of the occurrence of 0 burst. In this embodiment, the number of bits necessary for the determination of the occurrence of 0 burst is set to "9". When the count value of the 0 burst counter 23*a* is "9", the detector 23 signals that the first 0 burst 57*a* has been detected. After the detection of the first 0 burst 57*a*, the servo mark detector 23 resets the value of the counter 23*a* and temporarily stops the counting operation.

In the next step 86, the servo mark detector 23 the error counter 23*b* to initiate the counting operation. In step 87, the servo mark detector 23 causes restarts the counting operation of the 0 burst counter 23*a* to detect the second 0 burst 57*c*.

In step 88, the servo mark detector 23 waits until the count value of the 0 burst counter 23*a* reaches "9". When the count value of the 0 burst counter 23*a* reaches "9", the servo mark detector 23 signals that the second 0 burst 57*c* has been detected.

In step 88, when the servo signal RD1*a* of "1" is input to the servo mark detector 23, due to noise or the like, the 0 burst counter 23*a* clears the count value. In this case, the count value of the 0 burst counter 23*a* does not become "9". At this time, the servo mark detector 23 goes to step 89 to determine if the count value of the error counter 23*b* has reached a predetermined value ("31" in this embodiment). The predetermined value is set to the number of bits of data from the beginning of the first 0 burst to the end of the servo mark 53*a* (31=3+2+12+2+12). When the error count value has not reached "31" yet, the servo mark detector 23 returns to step 88 to detect a 0 burst and waits until the count value becomes "9".

When the count value of the error counter 23*b* becomes "31" in step 89, the servo mark detector 23 clears the detection of the first 0 burst and returns to step 84 to repeat the detection of the first 0 burst. This is because there is a case where the data of the servo mark 53*a* has already ended, or the 0 burst detected in steps 84 and 85 does not constitute the servo mark 53*a*.

When the count value of the 0 burst counter 23*a* reaches "9" and the second 0 burst is detected in step 88, the servo mark detector 23 temporarily clears the count value of the error counter 23*b* in step 90 and then restarts the counting operation of the error counter 23*b* in step 91.

Further, the servo mark detector 23 determines if the data output from the first filter 22*a* is "1" in step 92. When the data which is being processed then and the data which has been input two clocks earlier are both "1", the first filter 22*a* outputs "1" (FIG. 3).

When the output data of the first filter 22*a* is "1", therefore, the servo mark detector 23 determines that data of the servo mark 53*a* has ended and the next data field, servo mark guard data 58, is being read. Then, the servo mark detector 23 outputs the servo mark detection signal SM to indicate that the servo mark 53*a* has been detected, and terminates the process.

The processing following step 90 is carried out because a servo mark 53*a* is simply detected immediately upon detection of two 0 bursts. The output timing for the servo mark detection signal SM varies depending on the following detection results: where the first 0 burst 57*a* is detected in step 85; where the second 0 burst 57*c* is detected in step 88; where the first or second 0 burst 57*a* or 57*c* is detected in step 85; and where the third 0 burst 57*e* is detected in step 88. Then, the detection position by the detection of the second 0 burst differs from the detection position by the detection of the third 0 burst. The servo mark detector 23 therefore sets the detection positions in these two cases to coincide with each other, by determining, based on the output data of the first filter 22*a*, that the detection of the servo mark 53*a* is made when the data in the servo guard area 58 is input. This is due to the fact that, as the servo guard area 58 comprises consecutive "1's", the output data of the first filter 22a also becomes "1".

When the output data of the first filter 22a is not "1" in step 92, the servo mark detector 23 determines, in step 93, whether the count value of the error counter 23b is a predetermined value ("18" in this embodiment). The predetermined error count value has previously been set to a value greater than the number of bits (=17=3+2+12) input until the end of the servo mark 53a since the detection of the second 0 burst. When the count value has not become "18" yet in step 93, the servo mark detector 23 returns to step 92 to wait for the input of the data in the servo guard area. That is, the servo mark detector 23 waits for the output data of the first filter 22a to become "1".

When the count value of the error counter 23b becomes "18" in step 93, the servo mark detector 23 outputs the servo mark detection signal SM to indicate the servo mark having been detected, and terminates the process. This is done to save two 0 burst detections when the output data of the first filter 22a does not become "1" due to a defective disk or the like.

The servo mark detector 23 may cause the error counter 23b to keep performing the counting operation even when the count value of the error counter 23b becomes "18" in step 93. At this time, the servo mark detector 23 waits for the output data of the first filter 22a to become "1" until the count value becomes a value (e.g., "31") corresponding to the predetermined number of data bits in the servo guard area. When the output of the first filter 22a does not become "1", the servo mark detector 23 returns to step 84 to detect the first 0 burst again. When detecting one 0 burst, the servo mark detector 23 may determine the servo mark being detected.

As shown in FIG. 2, the servo signal RD1a and the first clock signal CLK1 are input to the gray code decoder 24. As shown in FIG. 3, the gray code decoder 24 has a 0 burst counter 24a, a bit number counter 24b, a wait counter 24c and a repeat counter 24d. The 0 burst counter 24a carries out a count-up operation when the servo signal RD1a is "0", and clears the count value when the signal RD1a is "1". The bit number counter 24b, the wait counter 24c and the repeat counter 24d count up every time the servo signal RD1a is input.

Connected to the gray code decoder 24 are a control register 25 and a gray code register 26. A set value for decoding a gray code is stored in the control register 25. The HDC 15 stores the set value in the control register 25. The gray code decoder 24 is controlled in such a way as to operate after the servo mark 53a is detected by the servo mark detector 23. The gray code decoder 24 operates based on the first clock signal CLK1 and performs a gray mark detecting process and a gray code decoding process in accordance with the flowchart shown in FIG. 9. After detecting a gray mark based on the count value of the 0 burst counter 24a (FIG. 3), the gray code decoder 24 decodes a gray code based on the count value of the 0 burst counter 24a and the set value stored in the control register 25. Then, the decoder 24 sends the decoded gray code to the gray code register 26.

Figure 7:
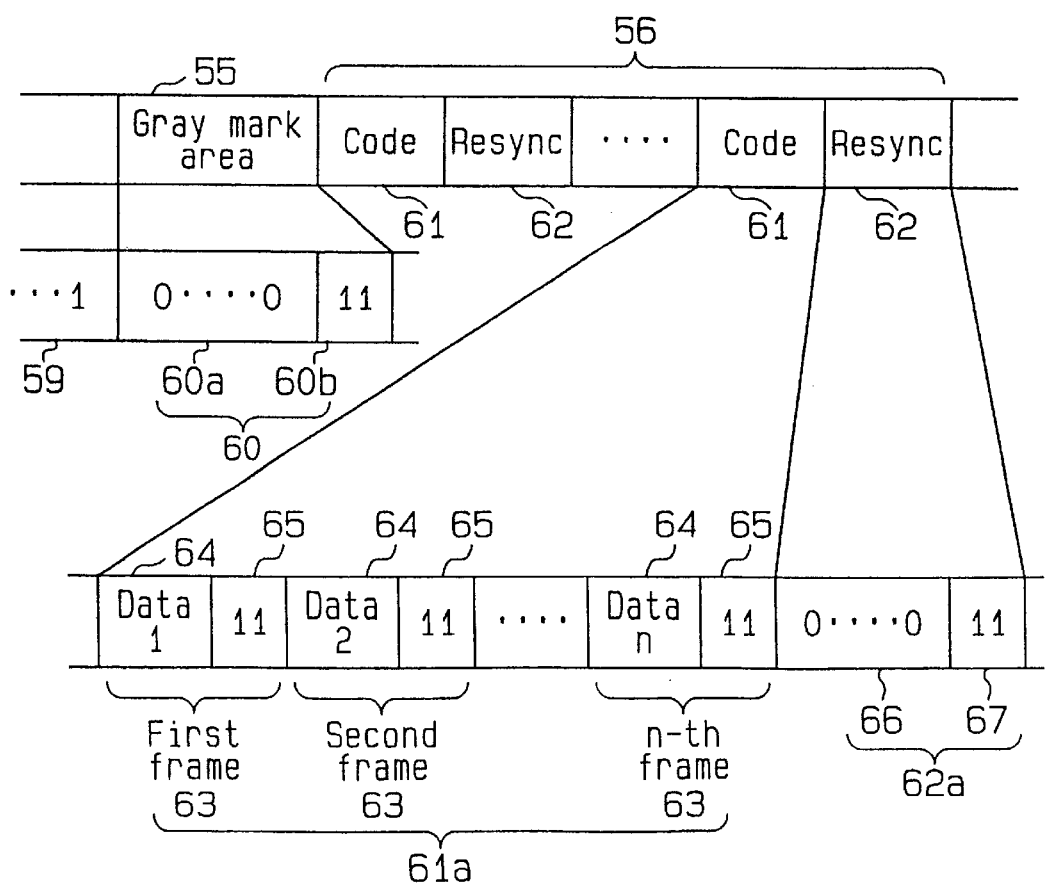
FIG. 7 is a diagram illustrating the formats of a gray mark and a gray code.

The gray mark and a gray code are formatted as shown in FIG. 7. Gray mark data (hereinafter simply called "gray mark") 60 is input to the gray code decoder 24 following a guard zone data 59 which comprises series of consecutive "1's". The gray mark 60 comprises a 0 burst 60a having preset n data of "0" and a gap 60b comprising of two data of "1".

The gray code area 56 comprises plural sets of code areas 61 and resync areas 62. Code data 61a stored in the code area 61 comprises a plurality of frames 63. Each frame 63 includes data 64 having a burst comprising consecutive bits of "0's" or "1's" and a gap 65 comprising two bits of "1's". FIG. 7 shows from the first frame to the n-th frame. Resync data 62a stored in the resync area 62 comprises of a 0 burst 66 having consecutive bits of "0's" and a gap 67 having two bits of "1's".

Next, the gray mark detecting process and the gray code decoding process will be discussed specifically with reference to FIG. 9.

Figure 9:
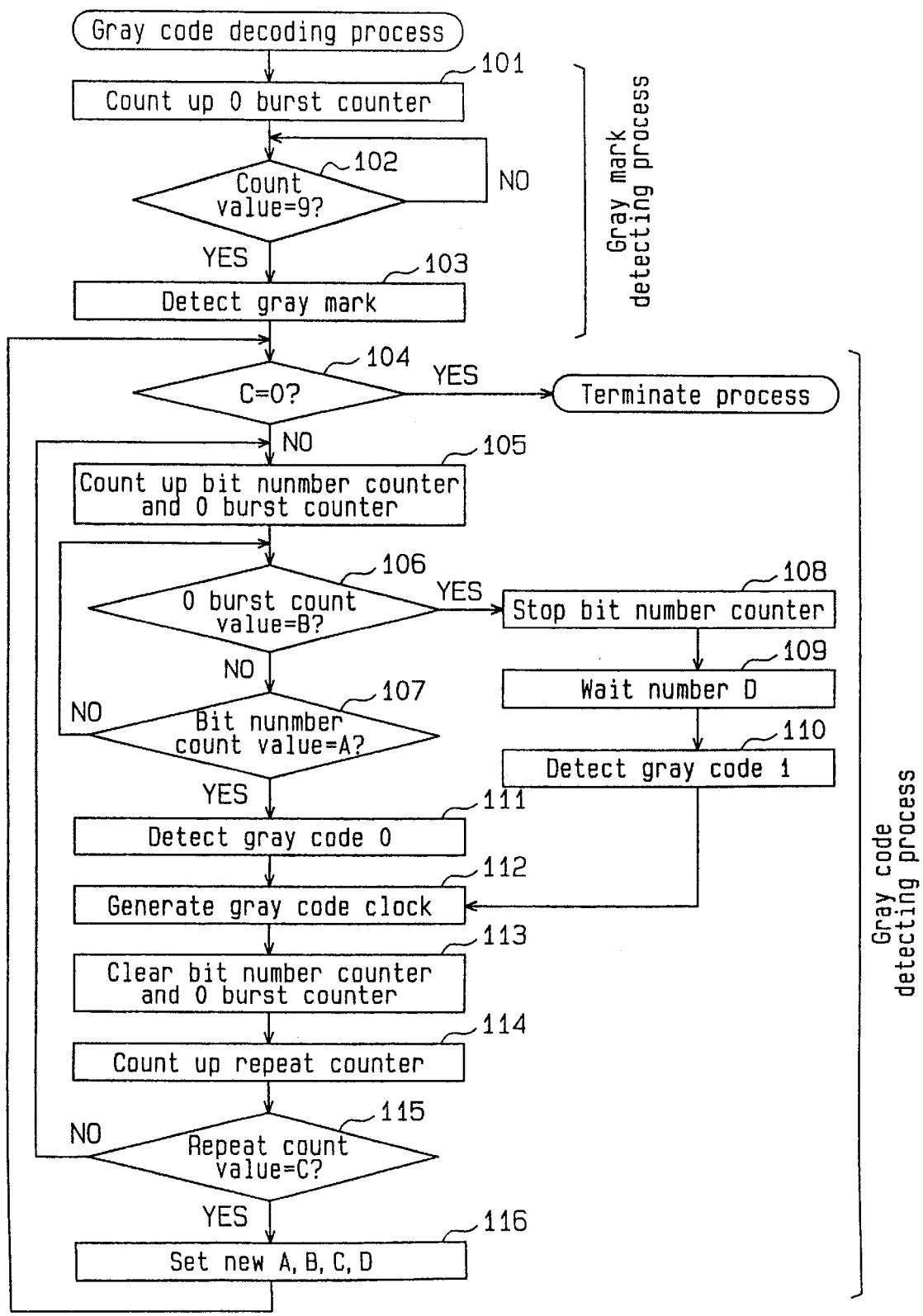
FIG. 9 is a flowchart illustrating a gray code decoding process.

First, the gray code decoder 24 performs the gray mark detecting process shown in steps 101 to 103 in FIG. 9. In step 101, the gray code decoder 24 causes the 0 burst counter 24a to initiate the counting operation. In step 102, the gray code decoder 24 stands by until the count value of the 0 burst counter 24a reaches the number of bits necessary to determine the 0 burst 60a. In this embodiment, the 0 burst 60a comprises 12 bits and the number of bits necessary to determine the 0 burst 60a is set to "9". When the count value of the 0 burst counter 24a reaches "9" in step 102, therefore, the gray code decoder 24 determines in step 103 that a gray mark has been detected.

Next, the gray code decoder 24 performs the gray code decoding process illustrated in steps 104 to 116 in FIG. 9. At this time, the gray code decoder 24 performs decoding process based on the set value stored in the control register 25. A value corresponding to the format of the gray code is input from the HDC 15, as that set value.

A set value A is the number of bits comprising one frame 63 or a frame length. A set value B is the number of bits necessary to determine if each data 64 is a 0 burst. A set value C is the number of frames 63 comprising a pair of codes 61a plus the number of resyncs (=1). A set value D is the set value B subtracted from the set value A. The set value B is set smaller than the set value A, and, specifically, is set to a value smaller than the number of bits comprising the data 64. After it is determined in steps 106 to 112, discussed later in accordance with the set value B that the data 64 is a 0 burst, the gray code decoder 24 detects a gray code 61. After it is determined, in accordance with the set value A, that the data 64 is a 1 burst, the gray code decoder 24 detects a gray code "0". The detection position for the gray code "1" is matched with the detection position for the gray code "0".

The set values A to D, set for each code data 61a comprising the gray code, are stored in the control register 25. The last set value C of the gray code is set to "0" to indicate the end of the gray code. The set values A to D stored in association with the individual pieces of code data 61a have the same values. That is, all the individual pieces of code data 61a have the same format. The set values A to D may vary from one code data 61a to another. In this case, the format of one code data 61a differs from that of another.

In step 104, the gray code decoder 24 determines if the set value C read from the control register 25 is "0". That is, the gray code decoder 24 determines whether the input of the gray code has been completed. When the input of the gray code has not yet been completed, the gray code decoder 24 proceeds to step 105.

In step 105, the gray code decoder 24 causes the bit number counter 24b and the 0 burst counter 24a to start their respective counting operations. In the next step 106, the gray code decoder 24 determines whether or not the count value of the 0 burst counter 24a matches with the set value B. When the count value of the 0 burst counter 24a does not coincide with the set value B, the gray code decoder 24 determines in step 107 if the count value of the bit number counter 24b matches with the set value A. When the count value of the bit number counter 24b does not match with the set value A, the gray code decoder 24 returns to step 106.

In other words, the gray code decoder repeats 24 the processing of steps 106 and 107 to determine if the data 64 is a 0 burst or a 1 burst. When the gray code decoder 24 determines in step 106 that the data 64 has a 0 burst, the process advances to step 108.

In step 108, the gray code decoder 24 stops the counting operation of the bit number counter 24b. In the subsequent step 109, the gray code decoder 24 stands by until the count value of the wait counter 24c reaches the set value D, or until the gap 65 following the data 64 is read. In step 110, the gray code decoder 24 determines that the data 64 of a 0 burst has been detected. The decoder 24 stores "1" into a latch (not shown) to indicate the detection of the gray code 1.

When it is determined in steps 106 and 107 that the data 64 has a 1 burst, the process proceeds to step 111 from step 107. In step 111, as the count value of the bit number counter 24b is the set value A and it is the end of the gap 65 following the data 64, the gray code decoder 24 immediately determines that the data 64 of a 1 burst has been detected. Then, the decoder 24 stores "0" into the latch to indicate the detection of the gray code "0".

After the detection of a 0 burst or 1 burst, the gray code decoder 24 generates a gray-code clock signal GC in step 112. The decoder 24 sends a gray code signal G1 of "0" or "1" stored in the latch to the gray code register 26 based on the clock signal GC. The gray code decoder 24 also sends the generated gray-code clock signal GC to the gray code register 26. The gray code register 26 is a shift register of a plurality of bits. The register 26 sequentially shifts the input gray code signal G1 based on the gray-code clock signal GC.

Then, the gray code decoder 24 clears the count values of the bit number counter 24b and the 0 burst counter 24a (sets them to 0) in step 113. In step 114, the gray code decoder 24 counts up the count value of the repeat counter 24d. The gray code decoder 24 determines in step 115 if the count value of the repeat counter 24d matches with the set value C. When there is no match, the gray code decoder 24 returns to step 105. Therefore, the gray code decoder 24 repeats the processing of steps 105 to 115 until the count value of the repeat counter 24d coincides with the set value C. At this time, the gray code decoder 24 decodes each data 64 stored in one code area 61, and stores the decoded data in the gray code register 26.

Next, the gray code decoder 24 reads out the next set values A to D stored in the control register 25 in step 116. Then, the decoder 24 returns to step 104 to determine if the set value C is "0". When the set value C is "0", the gray code decoder 24 terminates the gray code decoding process. Thus, the gray code decoder 24 repeats the sequence of processes in steps 104 to 116 until the set value C of "0" is read. Then, the decoder 24 decodes all the data 64 stored in the gray code area 56 and stores the decoded data in the gray code register 26.

A gray code stored in the gray code register 26 is read by the HDC 15. The HDC 15 acquires the sector number and head number included in the read gray code.

As shown in FIG. 2, the A-D converter 18 sends the digital data, which has been converted every time the first clock signal CLK1 has been input, to the DFT unit 27. The DFT unit 27, which performs discrete Fourier transform, executes a complex operation on the input digital data. Specifically, the DFT unit 27 calculates the phase information, position information and the like of the read head 12 based on the data read from the servo data area 54. The data computed by the DFT unit 27 is essential to drive the actuator 13, which moves the read head 12. The DFT unit 27 has a register 27a in which data during computation is stored. The DFT unit 27 sends the computation result to the operation controller 28.

The operation controller 28 is able to compute the position information and the like of the read head 12 and to control the DFT unit 27. When the servo mark detection signal SM is input to the operation controller 28 from the servo mark detector 23, the operation controller 28 instructs the DFT unit 27 to initiate the aforementioned computation. Then, the computation result from the DFT unit 27 is input to the operation controller 28. The operation controller 28 calculates the position information of the read head 12, etc. based on the DFT unit 27 computation result.

Figure 4:
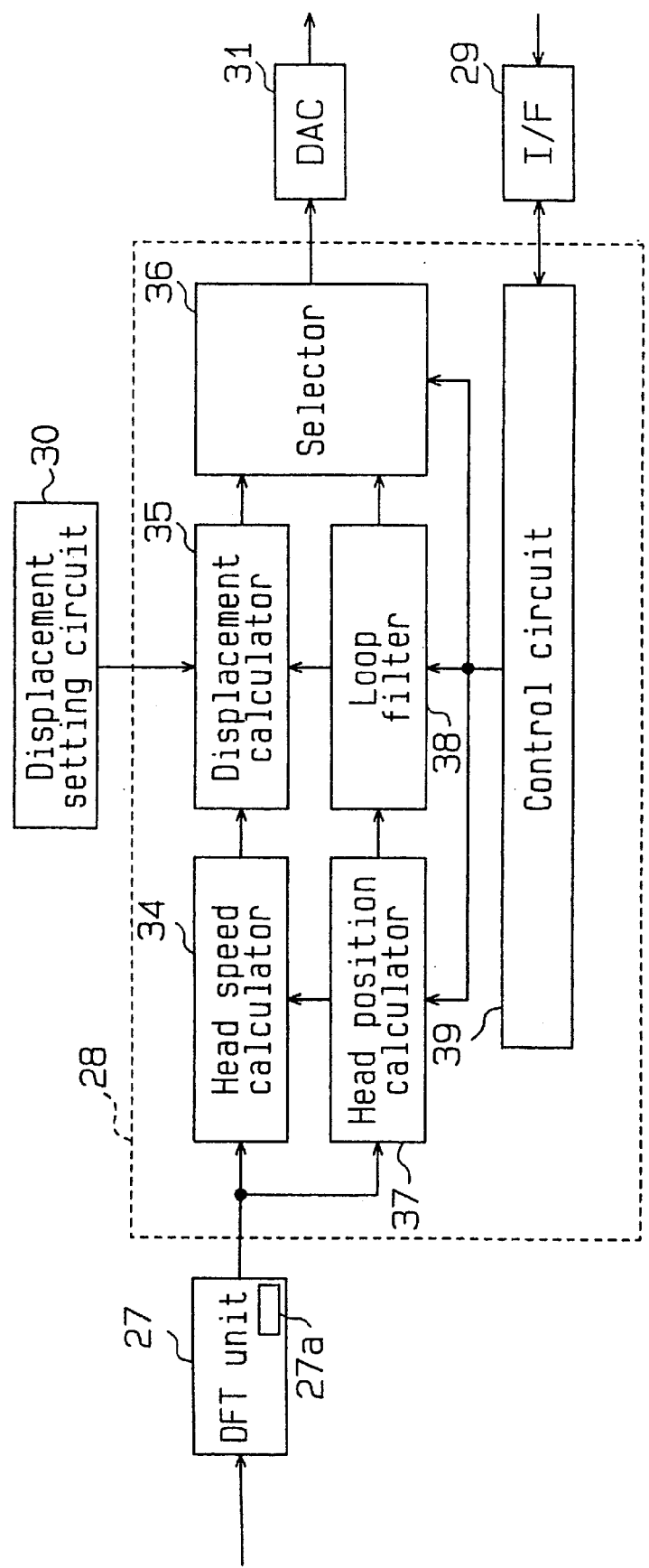
FIG. 4 is a schematic block diagram showing an operation controller for controlling the position of a head.

As shown in FIG. 4, the operation controller 28, comprises a digital signal processor (DSP), including a head speed calculator 34, a displacement calculator 35, a selector 36, a head position calculator 37, a loop filter 38 and a control circuit 39.

The head speed calculator 34 performs multiplication and addition of data received from the DFT unit 27 to compute the position information of the read head 12, which is moved by the actuator 13. The calculator 34 sends the computation result to the displacement calculator 35. The displacement calculator 35 calculates the displacement from the current position of the read head 12 to the target track based on the computation result from the head speed calculator 34 and a target displacement stored in a displacement setting register 30. The amount of displacement of the read head 12 stored in the displacement setting register 30 is computed by the HDC 15. The calculator 35 sends the computation result to the selector 36.

Based on the data recorded in the servo data area 54 (FIG. 5) according to the phase difference detection system, the head position calculator 37 performs multiplication and addition of data received from the DFT unit 27 to compute the phase information corresponding to the relative position of the read head 12 to the track. Then, the head position calculator 37 sends the computation result to the loop filter 38. The loop filter 38 filters the computation result from the head position calculator 37 to send only the frequency component to the selector 36, which is necessary for the on-tracking of the read head 12.

The head position calculator 37 compute the relative position of the read head 12 to a track by integrating the data input from the DFT unit 27 based on data recorded in the servo data area 54 in accordance with the area integration system.

At the seek time, when the read head 12 is moved between tracks, the selector 36 sends the output signal of the displacement calculator 35 to a D-A converter 31. At the on-tracking time, when the position of the read head 12 is matched with the track, the selector 36 sends the output signal of the loop filter 38 to the D-A converter 31. A selector 36 is controlled by the control circuit 39. The control signal is input via an interface circuit 29 to the control circuit 39 from the HDC 15. The control circuit 39 controls the servo mark detector 23, the gray code decoder 24, the DFT unit 27 and the operation controller 28 based on the control signal.

The operation controller 28 may be an MCU which is equipped with programs for computing the head speed, the head position and the like, as firmware. Alternatively, the operation controller 28 may be a combination of a DSP and MCU.

The D-A converter 31 converts the output signal (digital signal) of the operation controller 28 to an analog signal. The D-A converter 31 sends the analog signal to the actuator 13. A second clock signal CLK2, produced by the digital PLL circuit 32, is input to the D-A converter 31 (see FIG. 2). The digital PLL circuit 32 is connected to an oscillation frequency setting register 33. The first clock signal CLK1, which is produced by the analog PLL circuit 21, is input to the digital PLL circuit 32. The digital PLL circuit 32 frequency-divides the first clock signal CLK1 based on a set value stored in the oscillation frequency setting register 33, thereby yielding the second clock signal CLK2. The circuit 32 sends the second clock signal CLK2 to the D-A converter 31.

Every time the D-A converter 31 receives the second clock signal CLK2, the D-A converter 31 converts the output signal of the operation controller 28 to an analog signal and outputs the converted signal. The frequency of the second clock signal CLK2 is set lower than the frequency of the first clock signal CLK1, which is used for operating the DFT unit 27 and the operation controller 28. For instance, while the frequency of the first clock signal CLK1 is equal to or higher than 100 MHz, the frequency of the second clock signal CLK2 is around 10 KHz. This shortens the sampling interval of the read signal RD1b in response to the high-frequency first clock signal CLK1, thereby reducing an error in the operation of the digital signal. Further, the frequency setting allows the actuator 13 to be controlled by the low-frequency second clock signal CLK2 so that the read head 12 is not moved too fast. This prevents the over-response of the read head 12.

A description will now be given of the operation of the recorded data reading apparatus.

When the control signal is input from the HDC 15, the control circuit 39 (FIG. 4) of the operation controller 28 controls the servo mark detector 23, which in turn initiates the servo mark detecting process. In the servo mark detecting process, the servo signal RD1a, which has been read by the read head 12 and converted to a digital signal by the A-D converter 18, is input to the servo mark detector 23 via the digital filter 22. The servo mark detector 23 sends the servo mark detection signal SM to the control circuit 39 upon detection of the servo mark 53a from the servo signal RD1a.

Next, the control circuit 39 controls the gray code decoder 24, which initiates the gray code decoding process. In the gray code decoding process, the servo signal RD1a, which has been converted to a digital signal by the A-D converter 18, is input to the gray code decoder 24 via the digital filter 22 as in the case of the servo mark detector 23. The gray code decoder 24 detects the gray mark 60 from the servo signal, decodes the input gray code following the gray mark 60, and stores the decoded gray code in the gray code register 26.

The control circuit 39 also controls the DFT unit 27. The DFT unit 27 performs a complex operation and computes data for controlling the head position based on the servo signal RD1 which has been converted by the A-D converter 18. The control circuit 39 controls the head speed calculator 34 and the displacement calculator 35 at the seek time. As a result, the calculators 34 and 35 compute the amount of displacement of the read head 12 in the read channel IC 14. Then, the control circuit 39 sends the computation result to the actuator 13 via the D-A converter 31, in order to seek the read head 12 to the target track. Further, the control circuit 39 controls the head position calculator 37 at the on-tracking time. Consequently, the calculator 37 computes the position information of the read head 12 in the read channel IC 14. Then, the control circuit 39 sends the computation result to the actuator 13 via the D-A converter 31 to on-track the read head 12.

According to the first embodiment, as described above, the servo mark detector 23 and the gray code decoder 24 carry out processes to detect a servo mark based on the servo signal RD1a that has been converted to a digital signal. The recording density of the servo area 52 is improved as compared with the prior art that detects a servo mark according to the peak detection system. The increased density of the servo area 52 leads to a reduction in the area of the servo area 52. The reduced servo area 52 allows the data area for recording user data to be increased, thus improving the recording density of the magnetic disk 11.

According to the first embodiment, the read channel IC 14 incorporates circuits for computing the amount of displacement and the position information of the read head 12. It is therefore unnecessary to provide an expensive DSP outside the IC 14. It is also unnecessary to transfer data for computation to an external DSP. Thus, unlike the conventional read channel IC, the read channel IC 14 of the present invention does not require terminals for connection to an external DSP and an interface circuit for data transfer. The package of the read channel IC 14 is thus made smaller, accordingly. Further, the elimination of the interface circuit leads to a faster transfer speed of data for computing the position information of the read head 12, or the like, than that of the prior art, and improves the computing speed as well.

Second Embodiment

Figure 10:
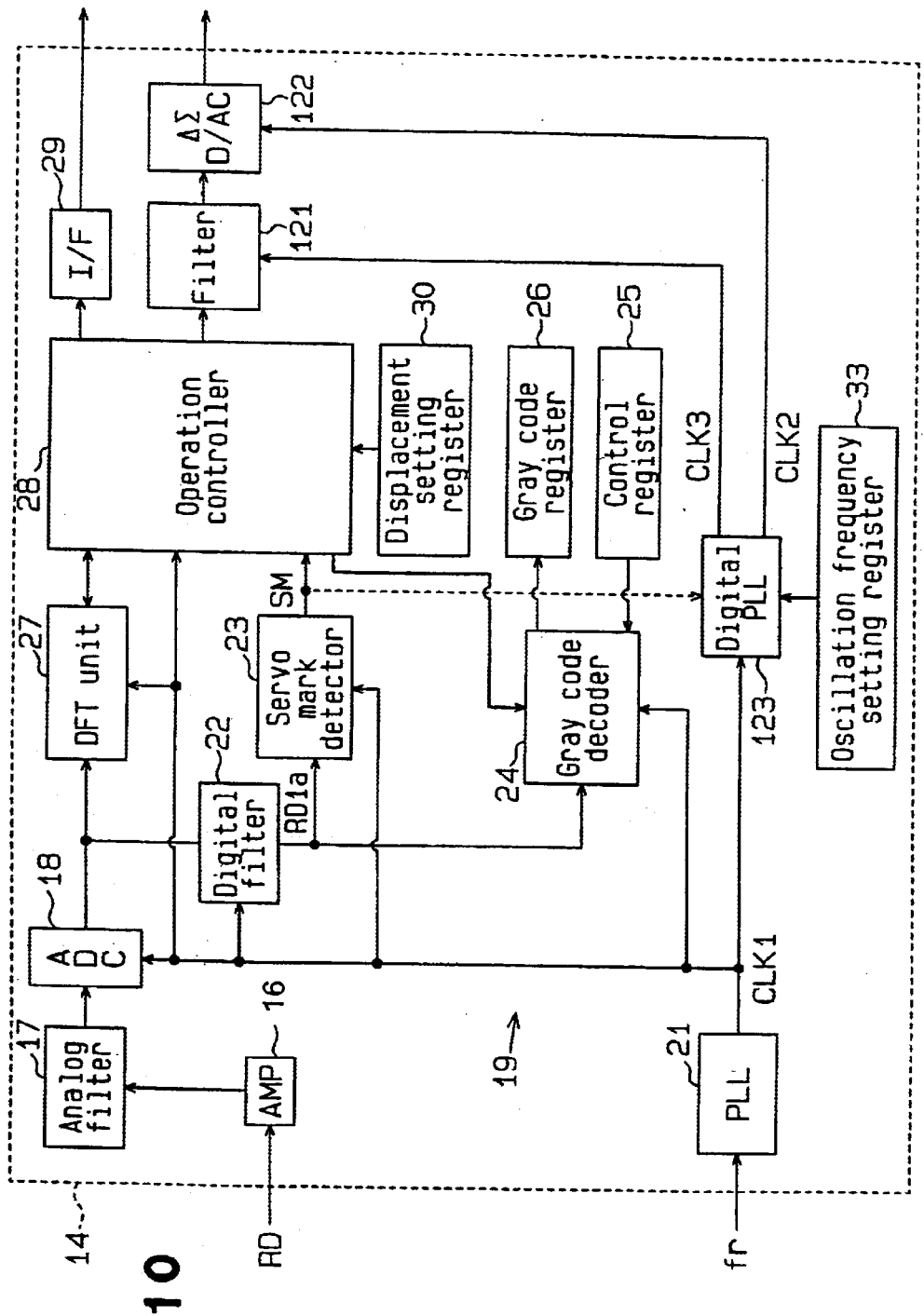
FIG. 10 is a schematic block diagram illustrating a part of a read channel IC according to a second embodiment of the present invention.

A second embodiment of the present invention will now be described referring to FIG. 10.

The read channel IC 14 according to the second embodiment incorporates an includes filter 121 and $\Delta\Sigma$ (delta-sigma) type D-A converter 122. The interpolation filter 121 serves to over-sample the output signal of the operation controller 28 for interpolation. The D-A converter 122 serves to over-sample the output signal of the interpolation filter 121 for conversion to an analog signal. The over-sampling ratio of the interpolation filter 121 to the D-A converter 122 is set by third and second clock signals CLK3 and CLK2 which are input from a digital PLL circuit 123. According to the second embodiment, the over-sampling ratio is set within about 30 to about 50.

The first clock signal CLK1 produced by the PLL circuit 21 is input to the digital PLL circuit 123. The digital PLL circuit 123 frequency-divides the first clock signal CLK1 based on the set value stored in the oscillation frequency setting register 33 to generate the third and second clock signals CLK3 and CLK2. The PLL circuit 123 respectively sends the third and second clock signals CLK3 and CLK2 to the interpolation filter 121 and the D-A converter 122. While the frequency of the first clock signal CLK1 is set equal to or higher than 100 MHz, the frequency of the third clock signal CLK3 is set to several MHz and the frequency of the second clock signal CLK2 is set around 10 KHz.

Since the interpolation filter 121 and the D-A converter 122 for over-sampling signals comprise digital circuits, the circuits 121 and 122 are easily integrated into the read channel IC 14. That is, the entire servo functions are formed into a single chip in the read channel IC 14. This design reduces the number of parts of the recorded data reading apparatus and thus lowers the manufacturing cost.

The present examples and embodiment are to be considered as illustrative and not restrictive and the invention is not to be limited to the details given herein, but may be modified within the scope and equivalence of the appended claims.

What is claimed is:

1. A method of detecting a servo mark among a digital data signal read from or generated on the basis of a recorded medium with a read head, the method comprising:

filtering the digital data signal;
analyzing the filtered digital data signal to detect a first predetermined sequence of bits, the detection of the first predetermined sequence of bits indicating detection of a first burst;
incrementing a first error count value for each bit of analyzed data after detecting the first burst;
monitoring the first error count value and, in response to the first error count value reaching a first predetermined error count value, clearing detection of the first burst;
analyzing the filtered digital data signal to detect a second predetermined sequence of bits, the detection of the second predetermined sequence of bits indicating detection of a second burst;
incrementing a second error count value for each bit of analyzed data after detecting the second burst; and
monitoring the second error count value and, in response to the second error count value reaching a second predetermined error count value, setting a servo mark detection signal.

2. The method of claim 1, wherein when the first error count value reaches the first predetermined error count value and detection of the first burst is cleared, repeating said analyzing the filtered digital data signal to detect a first predetermined sequence of bits, to detect the first burst.

3. A method of detecting a servo mark among a digital data signal read from or generated on the basis of a recorded medium with a read head, the method comprising:
filtering the digital signal to generate a first filtered signal and a second filtered signal;
analyzing the first and second filtered signals to detect a first predetermined sequence of bits, the detection of the first predetermined sequence of bits indicating detection of a first burst, by performing a logical operation for the first filtered signal and the second filtered signal;
incrementing a first error count value for each bit of analyzed data after detecting the first burst;
monitoring the first error count value and, in response to the first error count value reaching a first predetermined error count value, clearing detection of the first burst;
analyzing the first and second filtered signals to detect a second predetermined sequence of bits, the detection of the second predetermined sequence of bits indicating detection of a second burst, by performing the logical operation for the first filtered signal and the second filtered signal;
incrementing a second error count value for each bit of analyzed data after detecting the second burst; and
setting a servo mark detection signal in response to detecting the second burst.

4. The method of claim 3, further comprising monitoring the second error count value and, in response to the second error count value reaching a second predetermined error count value, setting the servo mark detection signal.

5. The method of claim 3, further comprising monitoring the second error count value and, in response to the second error count value reaching a second predetermined error count value, clearing the first zero burst.

6. A method of detecting a servo mark among a digital data signal read from or generated on the basis of a recorded medium with a read head, the method comprising:
filtering the digital data signal;
analyzing the filtered digital data signal to detect a first predetermined sequence of bits, the detection of the first predetermined sequence of bits indicating detection of a first burst;
incrementing a first error count value for each bit of analyzed data after detecting the first burst;
monitoring the first error count value and, in response to the first error count value reaching a first predetermined error count value, clearing detection of the first burst;
analyzing the filtered digital data signal to detect a second predetermined sequence of bits, the detection of the second predetermined sequence of bits indicating detection of a second burst;
incrementing a second error count value for each bit of analyzed data after detecting the second burst; and
monitoring the second error count value and, in response to the second error count value reaching a second predetermined error count value, clearing the first burst,
wherein when the first error count value reaches the first predetermined error count value and detection of the first burst is cleared, repeating said analyzing the filtered digital data signal to detect a first predetermined sequence of bits, to detect the first burst.

7. A method of detecting a servo mark among a digital data signal read from or generated on the basis of a recorded medium with a read head, the method comprising:
filtering the digital data signal;
analyzing the filtered digital data signal to detect a first predetermined sequence of bits, the detection of the first predetermined sequence of bits indicating detection of a first burst;
analyzing the filtered digital data signal to detect a second predetermined sequence of bits, the detection of the second predetermined sequence of bits indicating detection of a second burst;
incrementing a second error count value for each bit of analyzed data after detecting the second burst;
analyzing the filtered digital data signal to detect a third predetermined sequence of bits, the detection of the third predetermined sequence of bits indicating detection of a third burst; and
monitoring the second error count value and, in response to the second error count value reaching a predetermined error count value, setting a servo mark detection signal.

8. The method of claim 7, further comprising setting the servo mark detection signal in response to detecting the third burst.

9. The method of claim 7, further comprising:
incrementing a first error count value for each bit of analyzed data after detecting the first burst and prior to detecting the second burst; and
monitoring the first error count value and, in response to the first error count value reaching a first predetermined error count value, clearing detection of the first burst.

10. A method of detecting a servo mark among a digital data signal read from or generated on the basis of a recorded medium with a read head, the method comprising:
filtering the digital data signal to detect at least one of first level bits and at least one of second level bits;
counting a first sequence of the first level bits to detect a first burst;
counting a second sequence of the first level bits to detect a second burst;
incrementing an error count value for each of the first level bits and the second level bits after detecting the second burst;

counting bits of the first level bits after detecting the second burst; and setting a servo mark detection signal in response to either detecting the error count value reaching a predetermined error count value or detecting the count value of the first level bits reaching a predetermined count value.

11. A method of detecting a servo mark among a digital data signal read from or generated on the basis of a recorded medium with a read head, the method comprising:

filtering the digital data signal to generate at least one of first level signals and at least one of second level signals;

counting a first sequence of the first level signals to detect a first burst;

counting a second sequence of the first level signals to detect a second burst;

incrementing an error count value for each of the first level signals and the second level signals after detecting the second burst;

counting a third sequence of the first level signals to detect a third burst; and setting a servo mark detection signal in response to either detecting the error count value reaching a predetermined error count value or detecting the third burst.

12. A method of detecting a servo mark among a digital data signal read from or generated on the basis of a recorded medium with a read head, the method comprising:

filtering the digital data signal;

analyzing the filtered digital data signal to detect a first predetermined sequence of bits, the detection of the first predetermined sequence of bits indicating detection of a first burst;

analyzing the filtered digital data signal to detect a second predetermined sequence of bits, the detection of the second predetermined sequence of bits indicating detection of a second burst;

incrementing an error count value for each bit of analyzed data after detecting the second burst;

analyzing the filtered digital data signal to detect a third predetermined sequence of bits, the detection of the third predetermined sequence of bits indicating detection of a third burst; and setting a servo mark detection signal in response to either detecting the error count value reaching a predetermined error count value or detecting the third burst.

13. A method of detecting a servo mark among a digital data signal read from or generated on the basis of a recorded medium with a read head, the method comprising:

filtering the digital data signal;

analyzing the filtered digital data signal to detect a first predetermined sequence of bits, the detection of the first predetermined sequence of bits indicating detection of a first burst;

analyzing the filtered digital data signal to detect a second predetermined sequence of bits, the detection of the second predetermined sequence of bits indicating detection of a second burst;

incrementing an error count value for each bit of analyzed data after detecting the second burst; and monitoring the second error count value and, in response to the error count value reaching a predetermined error count value, setting a servo mark detection signal.

* * * * *